(12) United States Patent
Banerjee et al.

(10) Patent No.: US 10,392,908 B2
(45) Date of Patent: Aug. 27, 2019

(54) DOWNHOLE TOOLS HAVING SUPERHYDROPHOBIC SURFACES

(71) Applicants: Sudiptya Banerjee, Houston, TX (US); Deepak Kumar, Houston, TX (US); Adriana Hightower, Cypress, TX (US)

(72) Inventors: Sudiptya Banerjee, Houston, TX (US); Deepak Kumar, Houston, TX (US); Adriana Hightower, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/230,807

(22) Filed: Aug. 8, 2016

(65) Prior Publication Data

US 2018/0038206 A1 Feb. 8, 2018

(51) Int. Cl.
*E21B 43/08* (2006.01)
*C09D 7/61* (2018.01)
(Continued)

(52) U.S. Cl.
CPC .............. *E21B 43/082* (2013.01); *C08J 7/047* (2013.01); *C09D 5/1681* (2013.01); *C09D 7/40* (2018.01); *C09D 7/61* (2018.01); *C09D 127/18* (2013.01); *C09D 171/00* (2013.01); *C09D 181/04* (2013.01); *C08J 2323/28* (2013.01); *C08J 2327/02* (2013.01); *C08J 2327/14* (2013.01); *C08J 2327/16* (2013.01);
(Continued)

(58) Field of Classification Search
CPC ........ E21B 43/36; E21B 43/38; E21B 48/082; C08J 7/047; C08J 7/1216; C08J 2323/28; C08J 2327/02; C08J 2327/14; C08J 2327/16; C08J 2327/18; C08J 2427/18; C08J 2471/00; C08J 2481/04; C09D 127/18; C09D 171/00; C09D 181/04; C08K 3/22; C08K 3/36; C08K 2003/2231

See application file for complete search history.

(56) References Cited

U.S. PATENT DOCUMENTS

2008/0015298 A1    1/2008 Xiong et al.
2008/0260941 A1*  10/2008 Jin .................... B01J 35/0013
                                                    427/126.4

(Continued)

FOREIGN PATENT DOCUMENTS

WO    2012024099 A1    2/2012

OTHER PUBLICATIONS

Bhushan, et al. "Micro-, nano- and hierarchical structures for superhydrophobicity, self-cleaning and low adhesion", Phil. Trans. R. Soc. A (2009) 367, 1631-1672.

(Continued)

*Primary Examiner* — Nicole Coy
*Assistant Examiner* — Yanick A Akaragwe
(74) *Attorney, Agent, or Firm* — Cantor Colburn LLP

(57) ABSTRACT

A method of producing hydrocarbon from a subterranean formation comprises: disposing an article in a well penetrating a subterranean formation, the article having a surface coated with a hierarchical superhydrophobic coating or the article being a stand-alone hierarchical superhydrophobic membrane; contacting the article with a flow of a water-based fluid and an oil-based fluid; selectively impeding the flow of the water-based fluid; and allowing the production of the oil-based fluid.

21 Claims, 1 Drawing Sheet

(51) Int. Cl.
  *C08J 7/04* (2006.01)
  *C09D 127/18* (2006.01)
  *C09D 171/00* (2006.01)
  *C09D 181/04* (2006.01)
  *C09D 5/16* (2006.01)
  *C09D 7/40* (2018.01)
  *C08K 3/22* (2006.01)
  *C08K 3/36* (2006.01)

(52) U.S. Cl.
  CPC ........ *C08J 2327/18* (2013.01); *C08J 2427/18* (2013.01); *C08J 2471/00* (2013.01); *C08J 2481/04* (2013.01); *C08K 3/22* (2013.01); *C08K 3/36* (2013.01); *C08K 2003/2231* (2013.01)

(56) References Cited

U.S. PATENT DOCUMENTS

| | | |
|---|---|---|
| 2012/0034377 A1* | 2/2012 | Hailey, Jr. ............... E21B 43/04 427/244 |
| 2012/0160362 A1 | 6/2012 | Smith et al. |
| 2012/0292117 A1 | 11/2012 | John et al. |
| 2013/0014944 A1* | 1/2013 | Mazyar ................. E21B 43/385 166/265 |
| 2015/0053417 A1 | 2/2015 | Holderman |
| 2015/0129199 A1* | 5/2015 | Hoelscher ............. E21B 43/082 166/228 |

OTHER PUBLICATIONS

H. Song, et al., "Superhydrophobic PEEK/PTFE composite coating", Applied Physics A, Apr. 2008, vol. 91; pp. 73-76.
Q. Huang et al., "Design of super-hydrophobic microporous polytetrafluoroethylene membranes", New Journal of Chemistry, vol. 37, Issue 2, 2013; pp. 373-379.
R. Weng, et al., "Spray coating process in preparing PTFE-PPS composite super-hydrophobic coating", AIP Advances, vol. 4, 031327, 2014; 8 pages.
Van Der Wal, et al. "Super-hydrophobic surfaces made from Teflon", Soft Matter, vol. 3, 2007; pp. 426-429.
International Search Report, International Application No. PCT/US2017/039215, dated Oct. 26, 2017, Korean Intellectual Property Office; International Search Report 3 pages.
International Written Opinion, International Application No. PCT/US2017/039215, dated Oct. 26, 2017, Korean Intellectual Property Office; International Written Opinion 9 pages.

* cited by examiner

DOWNHOLE TOOLS HAVING SUPERHYDROPHOBIC SURFACES

BACKGROUND

Downhole completions are often used to produce or harvest fluids, e.g., hydrocarbons, from subterranean reservoirs, formations, or production zones. Undesirable fluids, e.g., water or brine, also are often located downhole. Moreover, downhole fluids can also contain particulates such as fines. As a result, flow control devices and oil/water separators have been contemplated for limiting production of the undesirable fluids or particulates in order to maximize the yield of the desirable fluids. Although various methods and devices have been developed, advances in flow control devices, and other systems and methods for limiting water, brine, or undesirable particles into a downhole production assembly are well received by the industry.

BRIEF DESCRIPTION

A method of producing hydrocarbon from a subterranean formation comprises: disposing an article in a well penetrating a subterranean formation, the article having a surface coated with a hierarchical superhydrophobic coating or the article being a stand-alone hierarchical superhydrophobic membrane; contacting the article with a flow of a water-based fluid and an oil-based fluid; selectively impeding the flow of the water-based fluid; and allowing the production of the oil-based fluid.

A subterranean oil/water separator comprising: a base pipe; and a screen radially outwardly disposed of the base pipe; the screen comprising a substrate and a hierarchical superhydrophobic coating disposed on a surface of the substrate or the screen comprising a stand-alone hierarchical superhydrophobic membrane.

BRIEF DESCRIPTION OF THE DRAWINGS

The following description should not be considered limiting in any way. With reference to the accompanying drawings, like elements are numbered alike.

DETAILED DESCRIPTION

Figure 1:
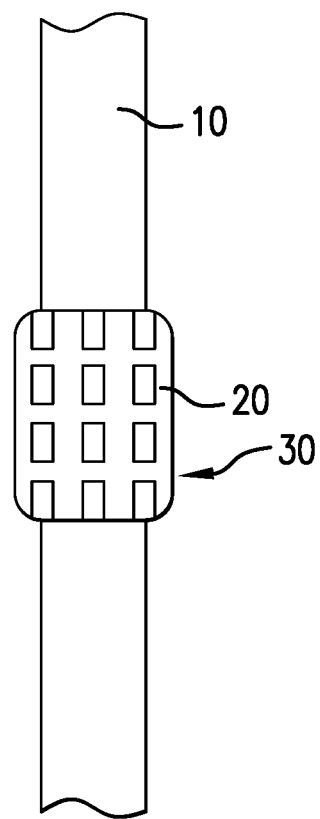
FIG. 1 illustrates an oil/water separator according to an embodiment of the disclosure.

An efficient method of producing hydrocarbon from a subterranean formation is disclosed by using an article having a surface coated with a hierarchical superhydrophobic coating or using a stand-alone hierarchical superhydrophobic membrane. When the article is contacted with a flow of a water-based fluid and an oil-based fluid, the hierarchical superhydrophobic coating or stand-alone hierarchical superhydrophobic membrane are effective to selectively impede the flow of the water-based fluid and allow the production of the oil-based fluid. As a further advantageous feature, in some embodiments, the hierarchical superhydrophobic coating or the stand-alone superhydrophobic porous membrane can selectively impede the flow of a water based fluid without a pressure drop.

As used herein, "superhydrophobic" refer to a surface or coating that is difficult to wet because of its chemical composition and/or geometric microstructure. Superhydrophobic coatings and membranes as disclosed herein have at least one of the following characteristics: a static contact angle greater than about 120°, greater than about 130°, greater than about 140°, or greater than about 150°; a contact angle hysteresis less than about 30°, less than about 20°, less than about 15°, or less than about 10°; or a roll-off angle less than about 20°, less than about 10°, or less than about 5°. In an embodiment, the superhydrophobic coatings and membranes have two of these characteristics. In another embodiment, the superhydrophobic coatings and membranes have all three characteristics.

Water-based fluid includes water and brine. The brine is, for example, seawater, produced water, completion brine, or a combination thereof. The brine can contain various salts such as KCl, NaCl, $ZnCl_2$, $MgCl_2$, $CaCl_2$, KBr, NaBr, $CaBr_2$, $ZnBr_2$, $NH_4Cl$, potassium formate, sodium formate, cesium formate, and the like. The oil based fluid includes hydrocarbons.

The hierarchical superhydrophobic coatings and stand-alone membranes have micro-sized surface structures, nano-sized surface structures, or a combination thereof. The shape of the micro-sized surface structures and nano-sized surface structures are not limited as long as they are effective to provide a lotus effect to the coating. In exemplary embodiments, the micro-sized surface structures and the nano-sized surface structures are in the form of periodic and/or non-periodic arrays of micro- and nano-sized platelets, tubules, protrusions, holes, particles, pits, grooves, trenches, pillars, peaks, craters, cones, bumps, or other surface features.

In addition to the micro-sized and/or nano-sized surface structures, the hierarchical superhydrophobic coating can comprise a polyphenylene sulphide/polytetrafluoroethylene composite, a polyether ether ketone/polytetrafluoroethylene composite, or a combination comprising at least one of the foregoing. The polyphenylene sulphide/polytetrafluoroethylene composite comprises polyphenylene sulphide and polytetrafluoroethylene in a relative weight ratio of about 1:0.1 to about 1:5, specifically about 1:0.5 to about 1:3. The polyether ether ketone/polytetrafluoroethylene composite comprises polytetrafluoroethylene and polyether ether ketone in a relative weight ratio of about 1:0.1 to about 1:5, specifically about 1:0.5 to about 1:3.

Optionally, the hierarchical superhydrophobic coating further comprises about 2 to about 5 vol. % of ceramic particles. The ceramic particles comprise silica, fluorine doped tin oxide, silicon doped tin oxide, silicon doped zinc oxide, or a combination comprising at least one of the foregoing. Without wishing to be bound by theory, it is believed that the presence of the ceramic particles in the coating can promote the adhesion between the coating and the substrate.

The coating can have a thickness of about 5 to about 50 microns, specifically about 5 microns to about 20 microns. When the substrate is a screen, the thickness of the coating varies depending on the screen opening (aperture) size.

A method of producing a hierarchical superhydrophobic coating comprises forming micro-sized surface structures, nano-sized surface structures, or a combination thereof on a substrate to provide a hierarchical surface, and disposing a dispersion of polyphenylene sulphide and polytetrafluoroethylene or a dispersion of polyether ether ketone and polytetrafluoroethylene composite, or a combination comprising at least one of the foregoing on the hierarchical surface, drying the dispersion to provide a coating, and sintering the coating.

The material for the substrate includes metallic such as copper, nickel, chromium, iron, titanium, alloys thereof, or a combination comprising at least one of the foregoing. In an embodiment, the material for the substrate comprises steel, nickel-chromium based alloys such as INCONEL, and nickel-copper based alloys such as MONEL alloys. The steel can be a stainless steel containing about 10% to about 20% of chromium. The stainless steel can also contain about 8% to about 18% of nickel. Nickel-chromium based alloys contain about 40-75% of Ni and about 10-35% of Cr. The nickel-chromium based alloys can also contain about 1 to about 15% of iron. Small amounts of Mo, Nb, Co, Mn, Cu, Al, Ti, Si, C, S, P, B, or a combination comprising at least one of the foregoing can also be included in the nickel-chromium based alloys. Nickel-copper based alloys are primarily composed of nickel (up to about 67%) and copper. The nickel-copper based alloys can also contain small amounts of iron, manganese, carbon, and silicon. As used herein, the term "metal-based alloy" means a metal alloy wherein the weight percentage of the specified metal in the alloy is greater than the weight percentage of any other component of the alloy, based on the total weight of the alloy.

The size and shape of the substrate are not particularly limited. In an embodiment, the substrate is a medium which is effective to filter formation solids from production fluid. Such screen substrate can be a slotted liner or a wire wrapped screen. The screen substrate can also be in a mesh form.

Various methods can be used to form the micro-sized and/or nano-sized surface structures. Exemplary methods include chemical etching, electro-chemical etching, laser ablating, laser additive manufacturing, extrusion, stamping, sand blasting, or by depositing small particles on the surface of the substrate. The particles and the surface can comprise the same material.

The polyphenylene sulphide/polytetrafluoroethylene composite, polyether ether ketone/polytetrafluoroethylene composite can be applied to the hierarchical surface by any method known in the art, for example, by hand spraying, electro-spraying, dipping, thermal evaporation coating, or other coating techniques, followed by sintering. In an embodiment, the coating is formed by dispersing the polyphenylene sulphide particles, polytetrafluoroethylene particles in a binder and/or solvent to form a dispersion; spraying the dispersion on the hierarchical surface; followed by sintering to fuse the particles together. Exemplary sintering conditions include about 275° C. to about 375° C. for about 1 to 3 hours at atmospheric pressure. Exemplary binder includes phenolic resin, phenoxy resin, epoxy resin, epoxy-phenolic resin, amine epoxy, or a combination comprising at least one of the foregoing. A polyether ether ketone/polytetrafluoroethylene composite coating can be prepared by replacing the polyphenylene sulphide particles with polyether ether ketone particles. Exemplary methods are described in AIP Advances 4, 031327 (2014) and Appl. Phys. A 91, 73-76 (2008).

The coating can be applied to internal, external, or both the internal and the external surfaces of articles such as a filter, membrane, tubular, sand screen, mesh, cover, sheet, the inner wall tube, pipe, safety valve, or flow control valves.

Figure 2:
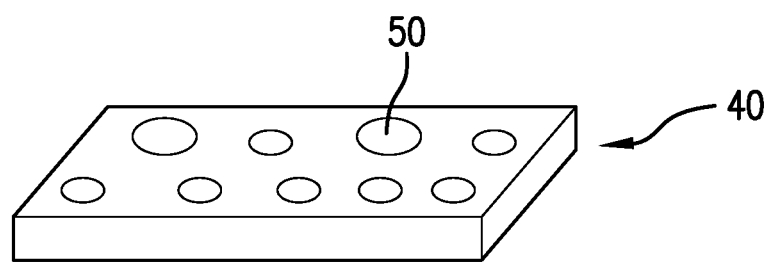
FIG. 2 illustrates a stand-alone superhydrophobic membrane.

The article can be a stand-alone hierarchical hydrophobic membrane. The stand-alone hierarchical superhydrophobic membrane can comprise a fluorometer. Exemplary fluoropolymers include polytetrafluoroethylene, polyethylenetetrafluoroethylene, fluorinated ethylene propylene copolymer, perfluoroalkoxy polymer, polyvinylidene fluoride, polyvinylfluoride, polychlorotrifluoroethylene, polyethylenechlorotrifluoroethylene, chlorotrifluoroethylenevinylidene fluoride, perfluoroelastomer, tetrafluoroethylene-propylene elastomeric copolymer, perfluoropolyether, perfluorosulfonic acid, or a combination comprising at least one of the foregoing fluoropolymers. FIG. 2 illustrates a stand-alone membrane according to an embodiment of the disclosure. The membrane 40 has a plurality of pores 50, which can selectively allow the oil-based fluid to pass through while impeding the flow of the water-based fluid.

The stand-alone membrane has a thickness of about 10 microns to about 250 microns, preferably about 25 microns to about 100 microns. The membrane can also have an average pore size of about 100 to about 400.

The micro-nano surface features can be formed by fast cooling of the membrane from high temperature sintering. An exemplary process is described in New Journal of Chemistry, Vol. 37, Issue 2, pp. 373-379, 2013. The method includes casting an aqueous solution of a fluoropolymer and polyvinyl alcohol into films on a plate or dish, drying the film, removing the film from the plate or dish, sintering the film, and cooling the film to room temperature rapidly at a rate faster than 10° C./min, preferably 1° C./min. The sintering temperature can vary based on the materials used. In an embodiment sintering temperature is about 325° C. to about 375° C. During the sintering process, the polyvinyl chloride is removed thus forming pores in the membrane. The ratio of the fluoropolymer and the polyvinyl alcohol can vary depending on the desired pore size of the stand-alone membrane.

The article can be part of a downhole tool, for example an oil/water separator. An illustrative oil/water separator is shown in FIG. 1. As shown in FIG. 1, the oil/water separator comprises a base pipe 10 and an article 30 disposed at the base pipe. The article 30 includes a plurality of openings 20.

Set forth below are various embodiments of the disclosure.

Embodiment 1

A method of producing hydrocarbon from a subterranean formation, the method comprising: disposing an article in a well penetrating a subterranean formation, the article having a surface coated with a hierarchical superhydrophobic coating or the article being a stand-alone hierarchical superhydrophobic membrane; contacting the article with a flow of a water-based fluid and an oil-based fluid; selectively impeding the flow of the water-based fluid; and allowing the production of the oil-based fluid.

Embodiment 2

The method of Embodiment 1, wherein the hierarchical superhydrophobic coating and the stand-alone hierarchical superhydrophobic membrane each independently has one or more of the following characteristics: a static contact angle greater than about 120°; a contact angle hysteresis less than about 30°; or a roll-off angle less than about 20°.

Embodiment 3

The method of Embodiment 1 or Embodiment 2, wherein the hierarchical superhydrophobic coating and the stand-alone hierarchical superhydrophobic membrane each independently has micro-sized surface structures, nano-sized surface structures, or a combination thereof.

Embodiment 4

The method of Embodiment 3, wherein the hierarchical superhydrophobic coating comprises a polyphenylene sulphide/polytetrafluoroethylene composite, a polyether ether ketone/polytetrafluoroethylene composite, or a combination comprising at least one of the foregoing.

Embodiment 5

The method of Embodiment 4, wherein the polyphenylene sulphide/polytetrafluoroethylene composite comprises polyphenylene sulphide and polytetrafluoroethylene in a relative weight ratio of about 1:0.1 to about 1:5.

Embodiment 6

The method of Embodiment 4, wherein the polyether ether ketone/polytetrafluoroethylene composite comprises polytetrafluoroethylene and polyether ether ketone in a relative weight ratio of about 1:0.1 to about 1:5.

Embodiment 7

The method of any one of Embodiments 1 to 6, wherein the hierarchical superhydrophobic coating further comprises about 2 to about 5 vol. % of ceramic particles.

Embodiment 8

The method of Embodiment 7, wherein the ceramic particles comprise silica, fluorine doped tin oxide, silicon doped tin oxide, silicon doped zinc oxide, or a combination comprising at least one of the foregoing.

Embodiment 9

The method of any one of Embodiments 1 to 8, wherein the hierarchical superhydrophobic coating is disposed on a metallic substrate.

Embodiment 10

The method of Embodiment 9, wherein the metallic substrate comprises copper, nickel, chromium, iron, titanium, alloys thereof, or a combination comprising at least one of the foregoing.

Embodiment 11

The method of any one of Embodiments 1 to 10, wherein the hierarchical superhydrophobic coating has a thickness of about 5 to about 50 microns.

Embodiment 12

The method of Embodiment 2, wherein the stand-alone membrane comprises a fluoropolymer.

Embodiment 13

The method of Embodiment 12, wherein the fluoropolymer comprises polytetrafluoroethylene, polyethylenetetrafluoroethylene, fluorinated ethylene propylene copolymer, perfluoroalkoxy polymer, polyvinylidene fluoride, polyvinylfluoride, polychlorotrifluoroethylene, polyethylenechlorotrifluoroethylene, chlorotrifluoroethylenevinylidene fluoride, perfluoroelastomer, tetrafluoroethylene-propylene elastomeric copolymer, perfluoropolyether, perfluorosulfonic acid, or a combination comprising at least one of the foregoing fluoropolymers.

Embodiment 14

The method of Embodiment 12 or Embodiment 13, wherein the stand-alone membrane has a thickness of about 25 microns to about 100 microns.

Embodiment 15

The method of any one of Embodiments 1 to 14, wherein the article is a filter, membrane, tubular, sand screen, mesh, cover, sheet, or a combination comprising at least one of the foregoing.

Embodiment 16

The method of any one of Embodiments 1 to 15, wherein the water based fluid comprises brine.

Embodiment 17

A subterranean oil/water separator comprising: a base pipe; and a screen radially outwardly disposed of the base pipe; the screen comprising a substrate and a hierarchical superhydrophobic coating disposed on a surface of the substrate or the screen comprising a stand-alone hierarchical superhydrophobic membrane.

Embodiment 18

The subterranean oil/water separator of Embodiment 17, wherein the hierarchical superhydrophobic coating and the stand-alone superhydrophobic membrane each independently has micro-sized surface structures, nano-sized surface structures, or a combination thereof.

Embodiment 19

The subterranean oil/water separator of Embodiment 17 or Embodiment 18, wherein the hierarchical superhydrophobic coating comprises a polyphenylene sulphide/polytetrafluoroethylene composite, a polyether ether ketone/polytetrafluoroethylene composite, or a combination comprising at least one of the foregoing.

Embodiment 20

The subterranean oil/water separator of Embodiment 17 or Embodiment 18, wherein the stand-alone membrane comprises polytetrafluoroethylene, polyethylenetetrafluoroethylene, fluorinated ethylene propylene copolymer, perfluoroalkoxy polymer, polyvinylidene fluoride, polyvinylfluoride, polychlorotrifluoroethylene, polyethylenechlorotrifluoroethylene, chlorotrifluoroethylenevinylidene fluoride, perfluoroelastomer, tetrafluoroethylene-propylene elastomeric copolymer, perfluoropolyether, perfluorosulfonic acid, or a combination comprising at least one of the foregoing fluoropolymers.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity). As used herein, the size or average size of the particles refers to the largest dimension of the particles and can be determined by high resolution electron or atomic force microscope technology.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of producing hydrocarbon from a subterranean formation, the method comprising:
    disposing an article in a well penetrating a subterranean formation, the article having a surface coated with a superhydrophobic coating having micro-sized surface structures, nano-sized surface structures, or a combination thereof disposed on an outer surface of the coating, the micro-sized surface structures and the nano-sized surface structures being in the form of periodic arrays of micro- and nano-sized platelets, tubules, protrusions, particles, pits, grooves, trenches, pillars, peaks, craters, cones, or bumps;
    contacting the article with a flow of a water-based fluid and an oil-based fluid;
    selectively impeding the flow of the water-based fluid; and
    allowing the production of the oil-based fluid,
    wherein the superhydrophobic coating is coated on a metallic substrate; and the superhydrophobic coating has a thickness of about 5 to about 50 microns.

2. The method of claim 1, wherein the superhydrophobic coating has one or more of the following characteristics: a static contact angle greater than about 120°; a contact angle hysteresis less than about 30°; or a roll-off angle with respect to the coating of less than about 20°.

3. The method of claim 1, wherein the superhydrophobic coating comprises a polyphenylene sulphide/polytetrafluoroethylene composite, a polyether ether ketone/polytetrafluoroethylene composite, or a combination comprising at least one of the foregoing.

4. The method of claim 3, wherein the polyphenylene sulphide/polytetrafluoroethylene composite comprises polyphenylene sulphide and polytetrafluoroethylene in a relative weight ratio of about 1:0.1 to about 1:5.

5. The method of claim 3, wherein the polyether ether ketone/polytetrafluoroethylene composite comprises polytetrafluoroethylene and polyether ether ketone in a relative weight ratio of about 1:0.1 to about 1:5.

6. The method of claim 1, wherein the superhydrophobic coating further comprises about 2 to about 5 vol. % of ceramic particles.

7. The method of claim 6, wherein the ceramic particles comprise silica, fluorine doped tin oxide, silicon doped tin oxide, silicon doped zinc oxide, or a combination comprising at least one of the foregoing.

8. The method of claim 1, wherein the metallic substrate comprises copper, nickel, chromium, iron, titanium, alloys thereof, or a combination comprising at least one of the foregoing.

9. The method of claim 1, wherein the superhydrophobic coating has a thickness of about 5 to about 20 microns.

10. The method of claim 1, wherein the article is a filter, membrane, tubular, sand screen, mesh, cover, sheet, or a combination comprising at least one of the foregoing.

11. The method of claim 1, wherein the water based fluid comprises brine.

12. The method of claim 1, wherein the substrate is a medium which is effective to filter a formation solid from the water-based fluid and the oil-based fluid.

13. The method of claim 12, wherein the substrate is a screen substrate.

14. The method of claim 12, wherein the screen substrate is a slotted liner or a wire wrapped screen or the screen substrate is in a mesh form.

15. A subterranean oil/water separator comprising:
    a base pipe; and
    a screen radially outwardly disposed of the base pipe; the screen comprising a substrate and a superhydrophobic coating coated on a surface of the substrate, the superhydrophobic coating having micro-sized surface structures, nano-sized surface structures, or a combination thereof disposed on an outer surface of the coating, the micro-sized surface structures and the nano-sized surface structures being in the form of periodic arrays of micro- and nano-sized platelets, tubules, protrusions, particles, pits, grooves, trenches, pillars, peaks, craters, cones, or bumps, wherein the superhydrophobic coating has a thickness of about 5 to about 50 microns.

16. The subterranean oil/water separator of claim 15, wherein the superhydrophobic coating comprises a polyphenylene sulphide/polytetrafluoroethylene composite, a polyether ether ketone/polytetrafluoroethylene composite, or a combination comprising at least one of the foregoing.

17. The subterranean oil/water separator of claim 15, wherein the membrane comprises polytetrafluoroethylene, polyethylenetetrafluoroethylene, fluorinated ethylene propylene copolymer, perfluoroalkoxy polymer, polyvinylidene fluoride, polyvinylfluoride, polychlorotrifluoroethylene, polyethylenechlorotrifluoroethylene, chlorotrifluoroethylenevinylidene fluoride, perfluoroelastomer, tetrafluoroethylene-propylene elastomeric copolymer, perfluoropolyether, perfluorosulfonic acid, or a combination comprising at least one of the foregoing fluoropolymers.

18. A subterranean oil/water separator comprising: a base pipe; and a screen radially outwardly disposed of the base pipe; the screen comprising a superhydrophobic coating having micro-sized surface structures, nano-sized surface structures, or a combination thereof disposed on an outer surface of the coating, the micro-sized surface structures and the nano-sized surface structures being in the form of periodic arrays of micro- and nano-sized platelets, tubules, protrusions, particles, pits, grooves, trenches, pillars, peaks, craters, cones, or bumps.

19. The method of claim 18, wherein the membrane comprises a fluoropolymer.

20. The method of claim 19, wherein the fluoropolymer comprises polytetrafluoroethylene, polyethylenetetrafluoroethylene, fluorinated ethylene propylene copolymer, perfluoroalkoxy polymer, polyvinylidene fluoride, polyvinylfluoride, polychlorotrifluoroethylene, polyethylenechlorotrifluoroethylene, chlorotrifluoroethylenevinylidene fluoride, perfluoroelastomer, tetrafluoroethylene-propylene elastomeric copolymer, perfluoropolyether, perfluorosulfonic acid, or a combination comprising at least one of the foregoing fluoropolymers.

21. The method of claim 19, wherein the membrane has a thickness of about 25 microns to about 100 microns.

* * * * *